United States Patent
Borad et al.

(10) Patent No.: US 11,320,347 B1
(45) Date of Patent: May 3, 2022

(54) PORTABLE, HIGH TEMPERATURE, HEAVY OIL WELL TEST UNIT WITH AUTOMATIC MULTI SAMPLING SYSTEM

(71) Applicant: En-Fab Inc., Houston, TX (US)

(72) Inventors: Mayur Borad, Houston, TX (US); Juan Pablo Rodriguez, Cypress, TX (US); Dane Anderson, Bakersfield, CA (US)

(73) Assignee: En-Fab, Inc.

( * ) Notice: Subject to any disclaimer, the term of this patent is extended or adjusted under 35 U.S.C. 154(b) by 0 days.

(21) Appl. No.: 17/521,014

(22) Filed: Nov. 8, 2021

(51) Int. Cl.
*G01N 1/20* (2006.01)
*E21B 49/08* (2006.01)
*G01F 1/74* (2006.01)
*B01F 25/40* (2022.01)

(52) U.S. Cl.
CPC .......... *G01N 1/2035* (2013.01); *B01F 25/40* (2022.01); *E21B 49/086* (2013.01); *G01F 1/74* (2013.01); *G01N 2001/205* (2013.01); *G01N 2001/2071* (2013.01)

(58) Field of Classification Search
CPC .... E21B 41/0007; E21B 49/081; E21B 49/08; E21B 49/0875; E21B 47/10; E21B 49/086; E21B 21/067; G01N 33/2823; G01N 1/2035; G01N 2035/0489; G01N 2030/8854; G01N 33/2847
See application file for complete search history.

(56) References Cited

U.S. PATENT DOCUMENTS

| | | | | |
|---|---|---|---|---|
| 4,454,772 A | * | 6/1984 | Brunner | G01N 1/10 73/863.31 |
| 5,211,842 A | * | 5/1993 | Tuss | B01D 19/0015 210/194 |
| 7,717,000 B2 | | 5/2010 | Xie et al. | |
| 7,942,065 B2 | | 5/2011 | Xie | |
| 8,245,572 B2 | | 8/2012 | Birkett et al. | |
| 8,256,283 B2 | | 9/2012 | Terabayashi et al. | |
| 8,966,969 B2 | | 3/2015 | Kriel et al. | |
| 9,334,728 B2 | | 5/2016 | Marshall | |
| 9,863,926 B2 | | 1/2018 | Kriel et al. | |
| 10,012,761 B2 | | 7/2018 | Jones et al. | |
| 10,416,015 B2 | | 9/2019 | Xie et al. | |

FOREIGN PATENT DOCUMENTS

WO    WO2019/117729 A1    6/2019

\* cited by examiner

*Primary Examiner* — John Fitzgerald
*Assistant Examiner* — Truong D Phan
(74) *Attorney, Agent, or Firm* — Haynes and Boone, LLP

(57) ABSTRACT

A portable, hydrocarbon well test unit for use with high temperature and high-pressure hydrocarbon wellbore flow includes a two-phase separator unit having a hydrocarbon inlet, a vapor outlet and a liquid outlet. A static mixer is in fluid communication with the liquid outlet. A liquid sampler positioned downstream of the static mixer ensures that liquid and gas are mixed to accurately represent a sample of the wellbore hydrocarbon flow. The sampler can be actuated to extract a sample of the mixed fluid. The sampler directs samples to a multi-position valve having a plurality of valve outlets, each outlet being in fluid communication with one of a plurality of sample bottles. A controller actuates the multi-position valve to direct a sample into a particular sample bottle, thereby allowing different types of samples to be taken over different time periods without the need for intervention for extended periods of time.

14 Claims, 7 Drawing Sheets

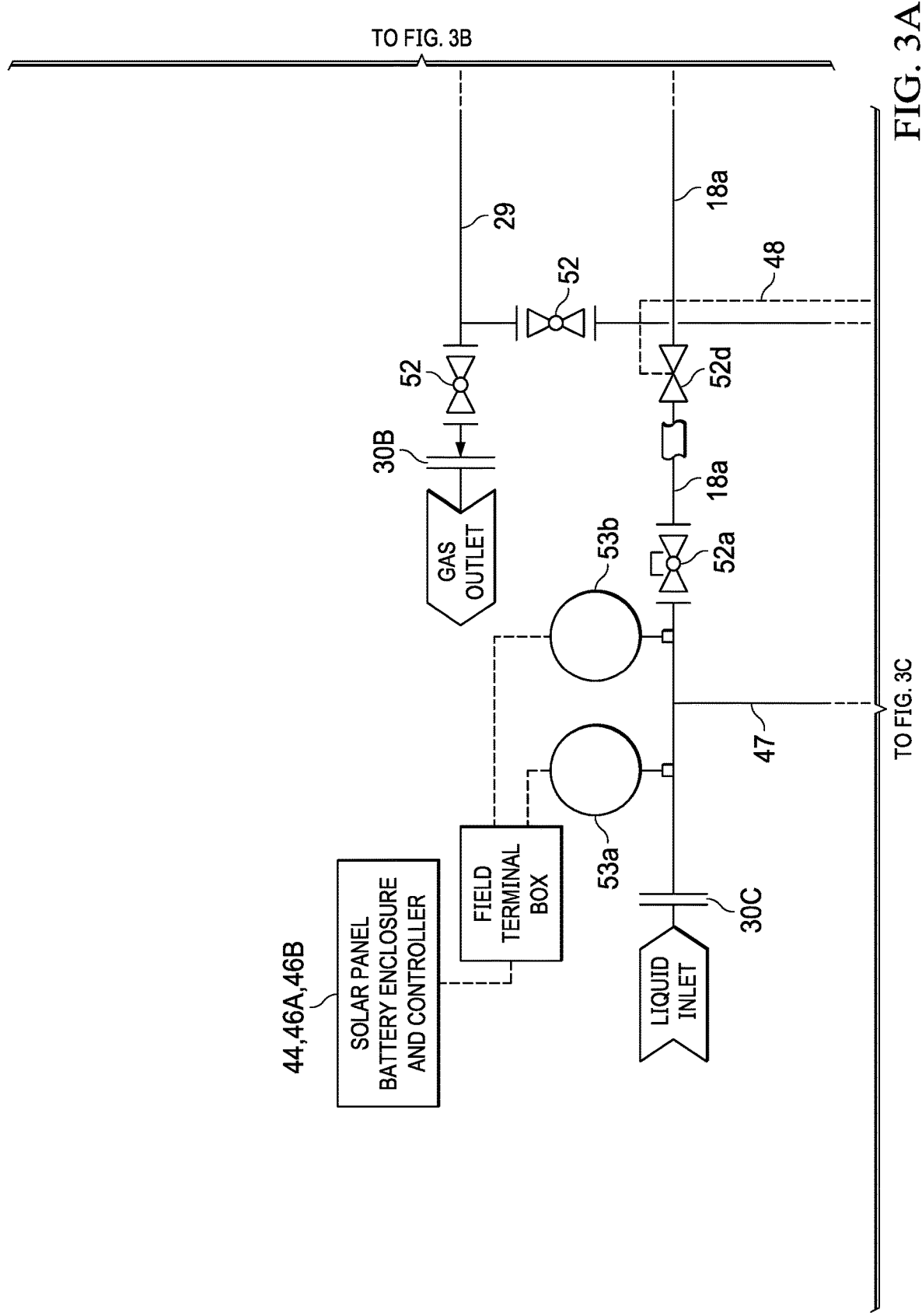

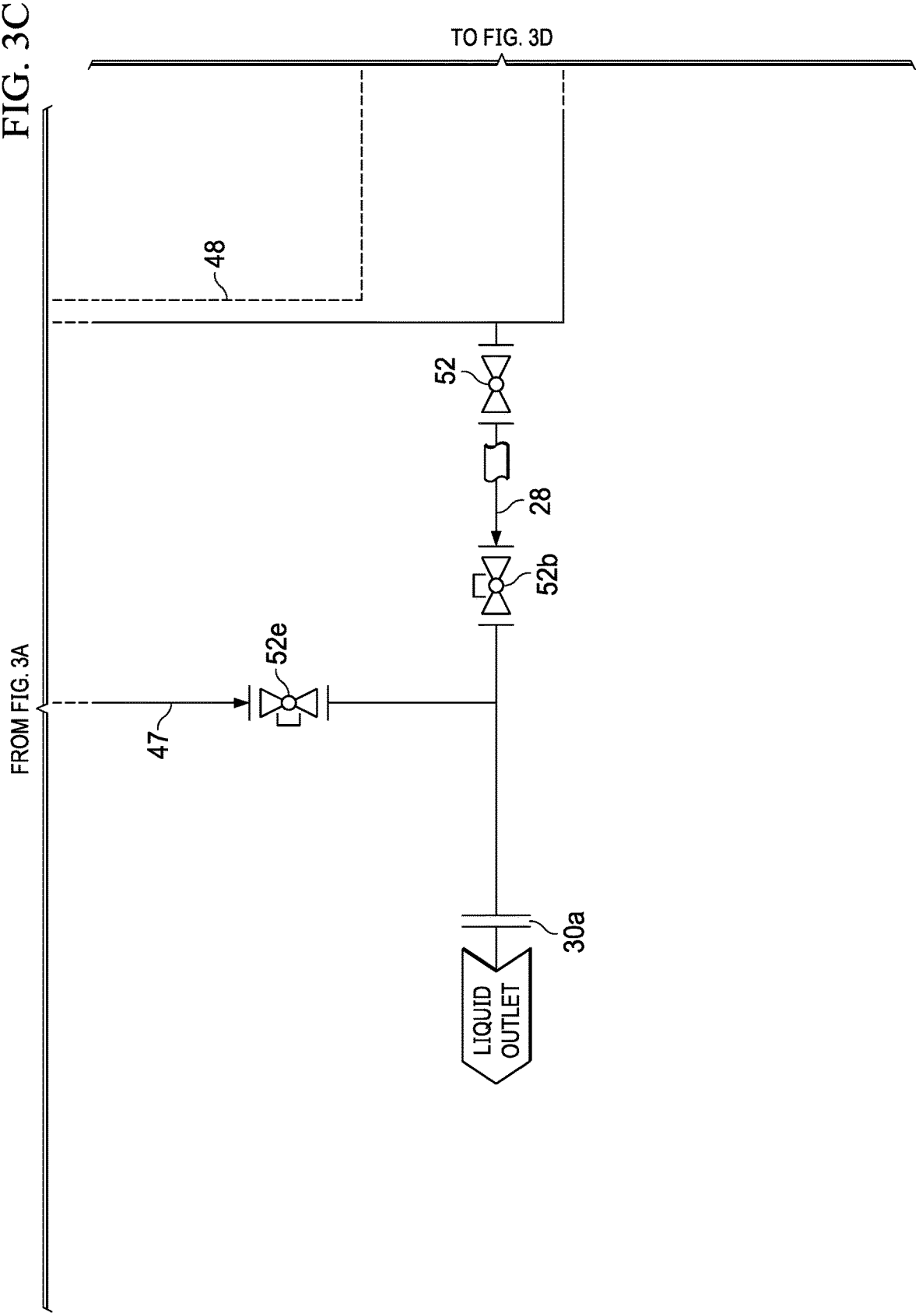

PORTABLE, HIGH TEMPERATURE, HEAVY OIL WELL TEST UNIT WITH AUTOMATIC MULTI SAMPLING SYSTEM

TECHNICAL FIELD OF THE INVENTION

The present disclosure relates to sampling of wellbore fluid, and more particularly to a system for acquiring multiple, representative samples for determining water and oil content of a liquid stream.

BACKGROUND OF THE INVENTION

A conventional method to measure the production of hydrocarbons is by a well test separator which separates wellbore fluid into separate streams of oil, water and gas. After separation, the volume of each liquid stream can then be measured. To do this, traditionally a manually operated tap is used to capture a sample of the liquid (usually from the separated oil stream) in a sample container or bottle and sent to a laboratory for basic sediment and water (BS&W) analysis. The water and oil production rate can then be calculated from the BS&W content of the liquid samples. For conventional sampling systems, the sample bottle/container needs to be replaced after each test manually by the operator. This is undesirable where a sample may be needed over different time periods or where different sample sizes may be needed or for remote system where ready access is prohibitive. More recently, cut sensors that can instantly identify a particular fluid in-situ have been utilized, replacing the traditional bottle and addressing many of the drawbacks of the traditional sampling system. However, it has been found that as water content in wellbore fluids increases, the accuracy of these cut sensors decreases. Thus, in wellbores that are subject to steam treatment where steam forms part of the formation fluid recovered at the wellhead, in-situ cut sensors may not provide sufficient accuracy. Moreover, such sensors may not withstand the high temperature and high pressure wellbore fluid resulting from steam treatments. This is also true of more traditional sampling systems discussed above.

BRIEF DESCRIPTION OF THE DRAWINGS

For a more complete understanding of the present disclosure and the advantages thereof, reference is now made to the following brief description, taken in connection with the accompanying drawings and detailed description:

FIGS. 3A-3D is a schematic diagram of the well test system of FIG. 1.

DETAILED DESCRIPTION OF THE EMBODIMENTS

Disclosed herein is stand-alone wellbore high temperature heavy oil test unit with fluid sampling system particularly desirable for use with wellbores subject to steam treatment, where the sampling system includes a skid or platform on which is mounted a two-phase separator unit to separate vapor fluid from liquid fluids produced from a wellbore. Liquid from the separator is directed to a mixer carried on the skid to homogenize the liquid flow. A liquid sampler or grabber extracts a sample of the homogenized liquid from the liquid flow and is directed to one of a plurality of sampling bottles via a multi-position valve in fluid communication with the grabber and a plurality of sample discharge lines, each in fluid communication with the multi-position valve. Each of the discharge lines is in fluid communication with a separate sample bottle. A controller mounted on the skid actuates the multi-position valve in order to direct a sample into a particular sample bottle. The controller also determines the frequency of the samples (seconds, minutes, hours, days) and the volume of each sample. A pressure sensor and a temperature sensor measure these values of the incoming formation fluid flow at the time the sample is taken and may be utilized to ensure that incoming formation fluid at high pressure and high temperature, commonly a result of wellbore steam treatments, will not damage the well test unit/sampling system. The controller can also correlate the pressure and temperature values with a particular sample bottle in order to evaluate the results of a particular steam treatment. The skid may include a solar panel to locally power certain controllers, valves, sensors and other electronics.

Figure 1:
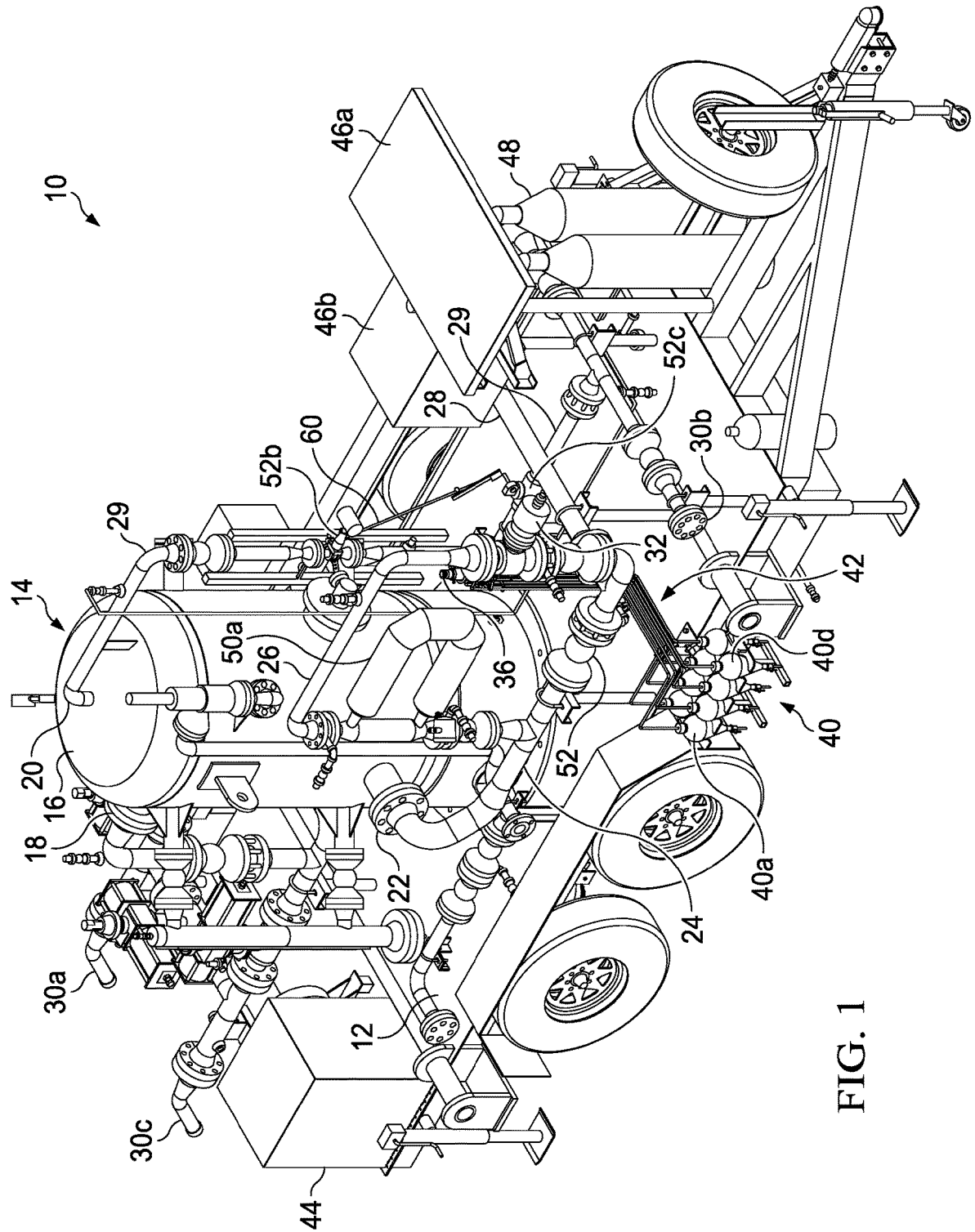
FIG. 1 is a perspective view of a well test system for taking multiple samples of wellbore fluid from a wellhead over an extended period of time.
Figure 2:
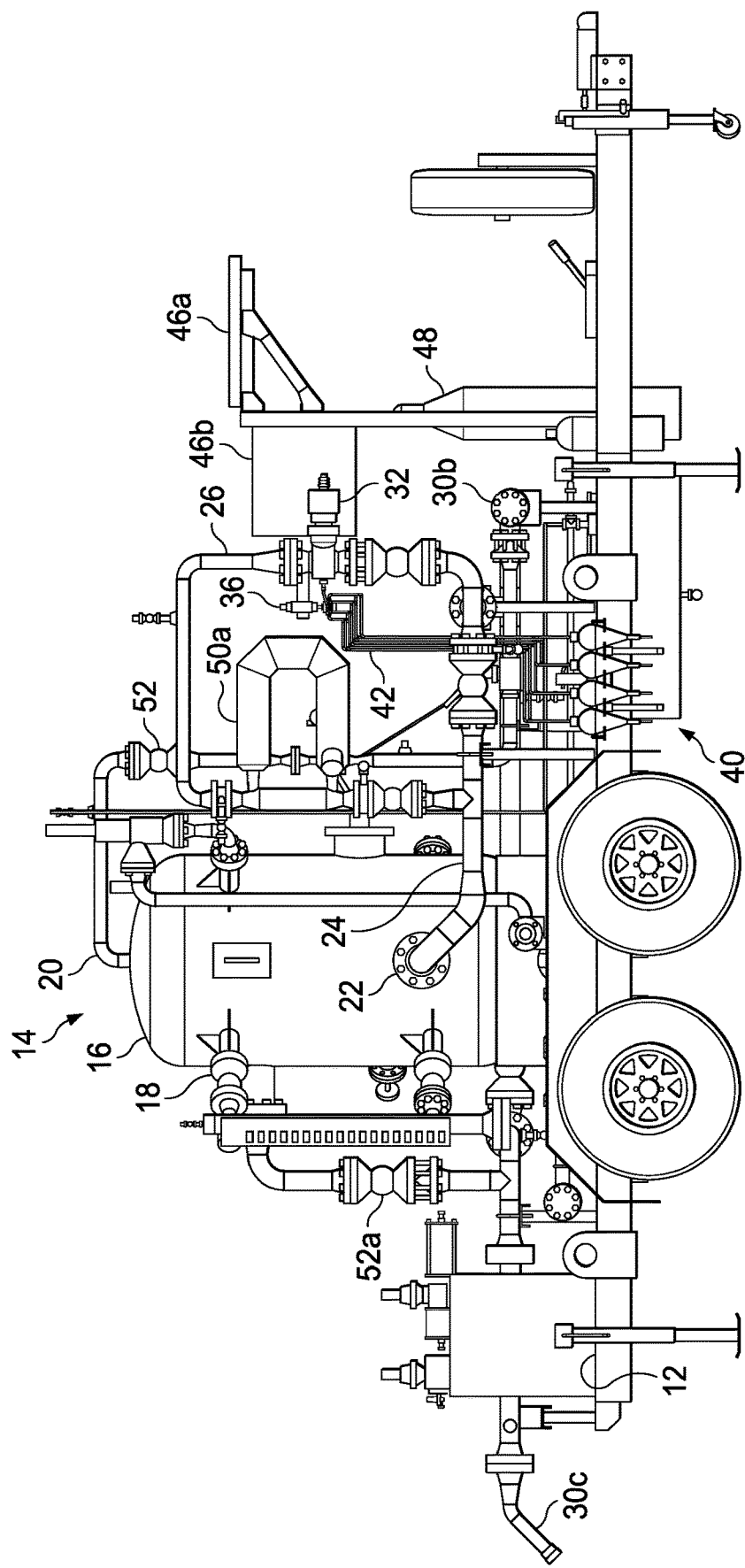
FIG. 2 is a side elevation view of a well test system for taking multiple samples of wellbore fluid from a wellhead over an extended period of time.
Figure 3B:
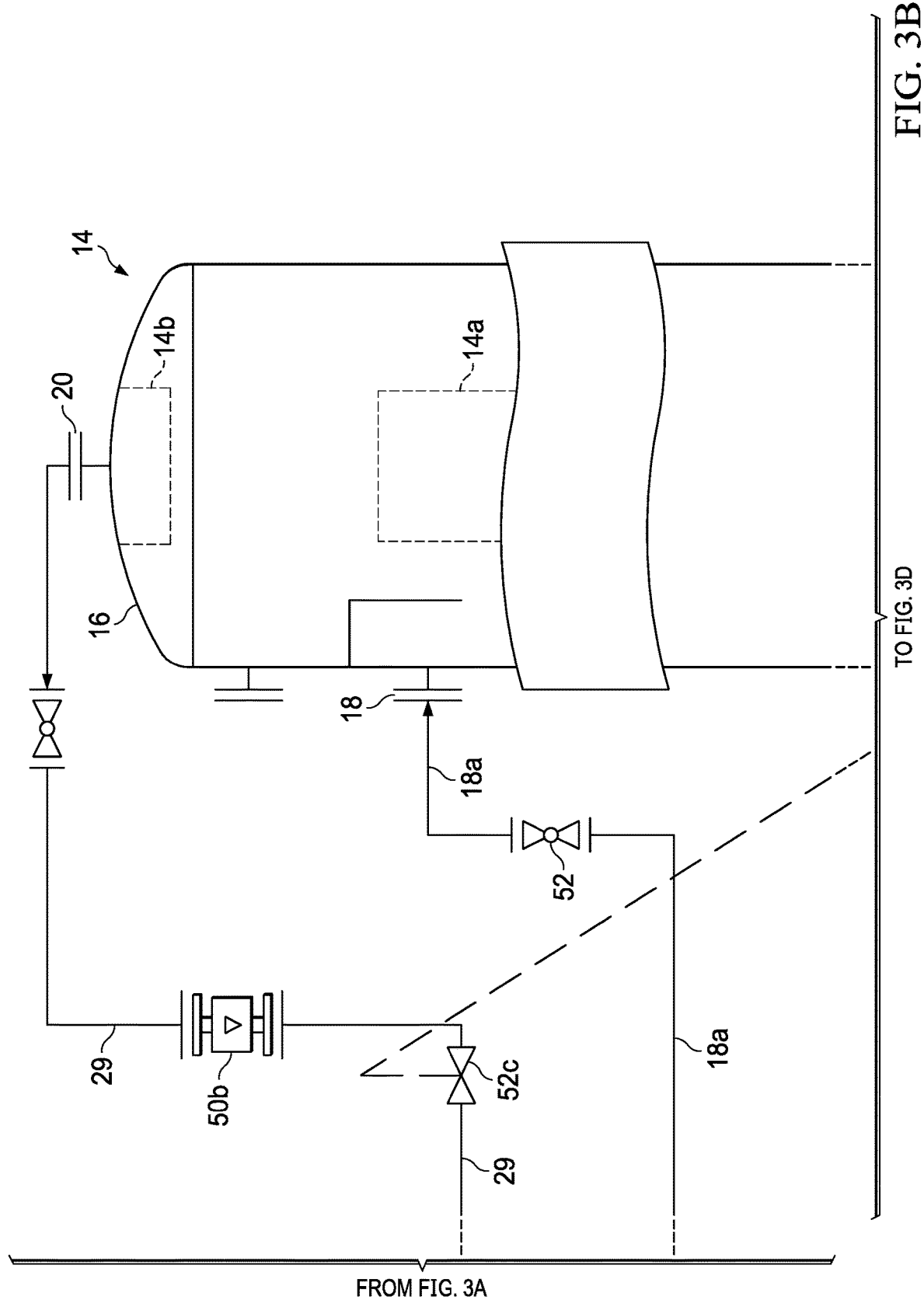
Figure 3D:
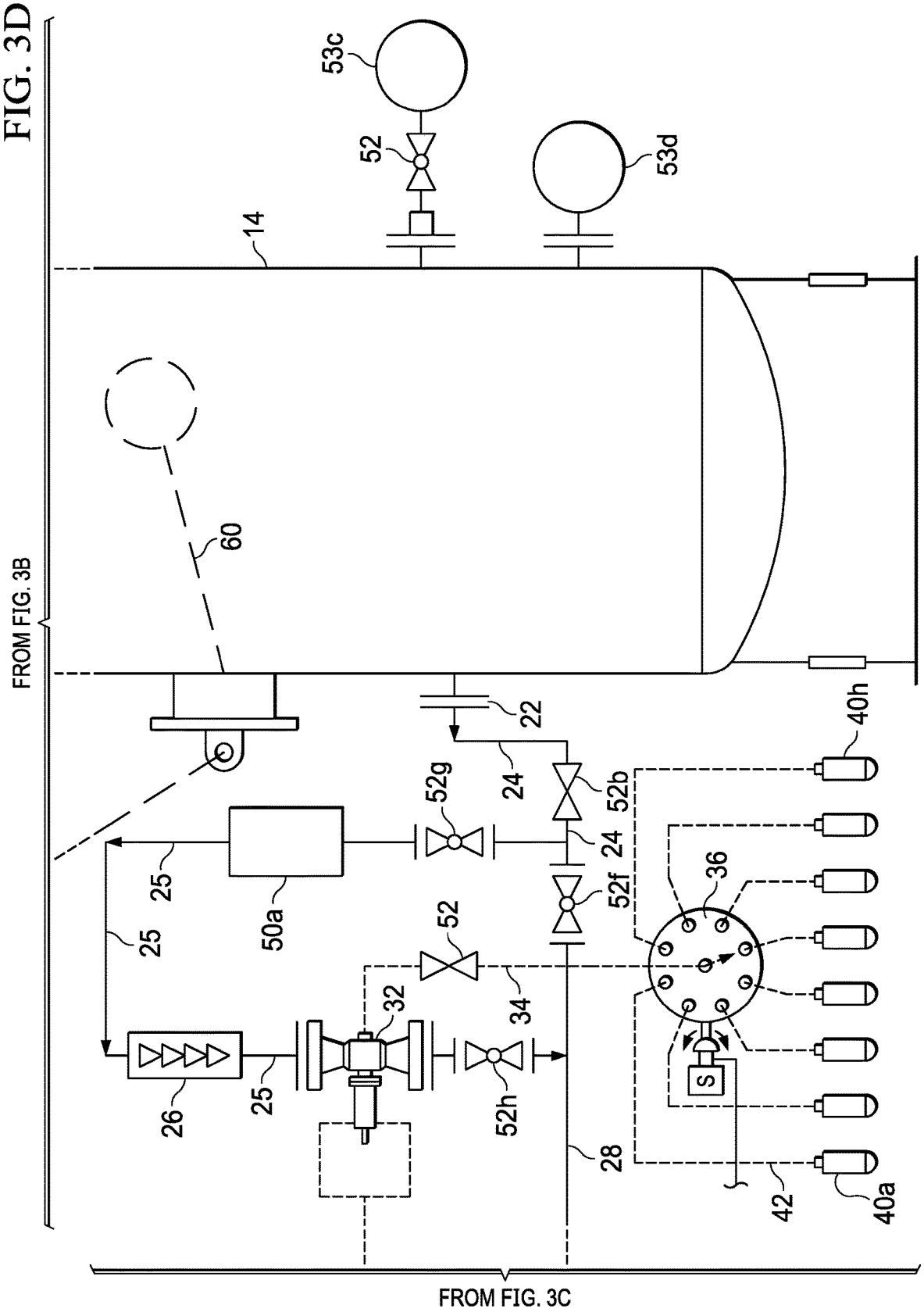

Turning to FIGS. 1 and 2, the wellbore fluid sampling system 10 is shown and includes a portable platform or skid 12 on which the other primary components of wellbore fluid sampling system 10 are mounted or carried. In one or more embodiments, the platform 12 may be a trailer. Persons of skill in the art will appreciate that the system 10 as described herein is self-contained, such that the platform 12 may be placed adjacent a wellhead (not shown) in a remote location, and thereafter gather samples without the need for human intervention. In any event, mounted on platform 12 is a two-phase separator unit 14 to separate vapor fluid from liquid fluids produced from a wellbore. Although described as a two-phase separator unit 14, as used herein, two-phase may mean at least two phases, but may also be multi-phase so long as at least a vapor fluid stream is at least partially separated from a liquid fluid stream. Likewise, there is not a limitation on the type of separator, although in one or more embodiments, separator unit 14 may have a separator internal 14a that is a vane-type. In one or more embodiments, separator unit 14 may have a cyclonic type internal. In one or more embodiments, separator unit 14 may have a fixed internal while in other embodiments, separator unit 14 may have a removable internal. The separator internal 14a does not required any power. Although not limited to a particular type of separator unit 14, in one or more embodiments, separator unit 14 may operate without the need for electric power since such power may be unavailable or limited in remote locations where wellbore fluid sampling system 10 is deployed. In one embodiment, separator unit 14 is a flow down, static separator. In any event, separator unit 14 generally includes a vessel 16 having a wellbore fluid inlet 18, and at least a vapor fluid outlet 20 and a liquid fluid outlet 22. In one or more embodiments, vessel 16 is elongated and may be vertical or horizontal. In the illustrated embodiment, vessel 16 is vertical, with fluid inlet 18 positioned adjacent an upper end of vessel 16 in an upper portion of vessel 16, liquid fluid outlet 22 positioned in a lower portion of vessel 16, and vapor fluid outlet 20 positioned above fluid inlet 18, such as in the top of vessel 16.

Separator unit 14 may also include a demister 14b to remove liquid droplets carried by vapor leaving vessel 16 via vapor outlet 20.

Fluid inlet 18 fluidically connects via fluid inlet flowline 18a to an inlet 30c which may be in fluid communication with a production line (not shown). In one or more embodiments, it will be appreciated that being directly or indirectly connected to fluidically communicate with a production line and/or flow from a wellhead, system 10 will be subject to the high pressures and high temperatures of the hydrocarbon flowing therefrom, and the embodiments of system 10 as described herein are arranged to minimize impact of such high pressure and high temperatures on the operation of system 10. In any event, a liquid flowline 24 fluidically connects liquid fluid outlet 22 to a flow loop 25 having a flowmeter 50a and mixer 26 disposed therealong. Flowmeter 50a is provided to measure the liquid flow rate of liquid flow along flow loop 25. Mixer 26 is provided to homogenize the liquid flow prior to extraction of a sample. In some embodiments, mixer 26 may be a static mixer. Although not limited to a particular type of mixer, in one or more embodiments, mixer 26 may be a pneumatic or otherwise operate without the need for electric power since such power may be unavailable or limited in remote locations where wellbore fluid sampling system 10 is deployed. In other embodiments, mixer 26 may be electric and disposed to utilize local power. Likewise, while mixer 26 is not limited to a particular type, mixer 26 is desirable for ensuring the ensuing sample captured below is properly representative of the liquid cut flowing into separator unit 14. It will be appreciated that in many types of two-phase separators, a liquid stream composed of liquids of different densities, such as for example, water and oil, may stratify into separate liquid components during separation of gas from liquid, such that a sample of the liquid stream may not be representative of the of the overall cut or percentage of each liquid component entering inlet 18. Mixer 26 homogenizes the liquid flow prior to extraction of a sample to ensure that a representative sample is acquired.

Various valves 52, as more specifically identified below, may be utilized to control the flowpath of fluids passing through wellbore fluid sampling system 10

A liquid return flowline 28 is in fluid communication with mixer 26 and sampler 32 and is disposed to generally direct liquid flow from the flow loop 25, and in particular, sampler 32, to a liquid outlet 30a which may be in fluid communication with a production line (not shown). In one or more embodiments, system 10 may also include a vapor outlet 30b which is in fluid communication with the vapor fluid outlet 20 of separator unit 14 via a vapor flowline 29. A vapor flow meter 50b and/or a level control valve 52c may be installed along vapor flowline 29 downstream of vapor outlet 20. In other embodiments, a level control valve 52c can be installed on the liquid flow line 28. In the illustrated embodiment, the level control valve 52c is a gas release valve installed along vapor flowline 29 and functions to maintain a certain gas pressure within vessel 16 in order to control the liquid level within vessel 16. Finally, while a separate liquid outlet 30a and vapor outlet 30b are shown, in other embodiments, vapor flowline 29 may also be plumbed to combine with liquid flowline 28 so that both liquid and vapor are routed to outlet 30a, thereby eliminating the need for outlet 30b.

In any event, disposed along liquid flowline 28, downstream of mixer 26 and a liquid flowmeter 50a is a liquid sampler or grabber 32. Sampler 32 is in fluid communication with liquid flowline 28 and is provided to extract a volume of liquid as a sample from the liquid phase flow exiting separator unit 14. Although not limited to a particular type of sampler, in one or more embodiments, sampler 32 may be a pneumatic sampler and operate without the need for electric power since such power may be unavailable or limited in remote locations where wellbore fluid sampling system 10 is deployed. Moreover, in high temperature applications such as collection of samples following steam treatments, because sampler 32 is fluidically in close proximity to outlet 22 of separator 14, the temperature of the liquid stream to which sampler 32 is subjected is relatively high and could prove harmful to electrically operated devices. In other embodiments, sampler 32 may be driven by process pressure, namely the pressure of fluid from the wellbore, in which case a pressure takeoff valve 52d upstream of fluid inlet 18 may be provided and in fluid communication with sampler 32. In other embodiments, the pressure takeoff valve 52d can be installed along the vapor flowline 29 or in an upper section of vessel 16 above the inlet 18 or along fluid inlet flowline 18a. In other embodiments, sampler 32 may be electric and disposed to utilize local power. In the illustrated embodiment, sampler 32 is pneumatic. Sampler 32 is operated by the pressure from high-pressure nitrogen bottles 48 for the instrument air installed on the platform to reduce the electric power consumption. In some embodiments, sampler 32 can sample at a rate of up to 120 grabs a minute to ensure the accuracy of a sample at a particular time period. While not limited to a particular sample volume, in one or more embodiments, each sample obtained by sampler 32 may be approximately 1 cubic centimeter.

Sampler 32 is disposed to direct captured samples via a flowline 34 to a multi-position valve 36 in fluid communication with sampler 32. In one or more embodiments, multi-position valve 36 is at least a 4-way valve with an inlet and four outlets, while in other embodiments, multi-position valve 36 is at least an 8-way valve, such as is shown in FIG. 1 with an inlet and 8 outlets. Valve 36 may be a rotary valve. Although not limited to a particular type of valve, in one or more embodiments, multi-position valve 36 may be a pneumatic valve and operate without the need for electric power since such power may be unavailable or limited in remote locations where wellbore fluid sampling system 10 is deployed. In other embodiments, multi-position valve 36 may be electric and disposed to utilize local power. In yet other embodiments, multi-position valve 36 may be driven by process pressure, namely the pressure of fluid from the wellbore, in which case a pressure takeoff valve 52d upstream of fluid inlet 18 may be provided and in fluid communication with multi-position valve 36. The pressure takeoff valve 52d can be installed along the vapor line 29 or in the upper section of vessel 16 above the inlet 18 or along fluid inlet flowline 18a. In the illustrated embodiment, multi-position valve 36 is pneumatic and operated by pressure available from the nitrogen bottles 48. In any event, multi-position valve 36 is disposed to direct a fluid sample obtained by sampler 32 to one of a plurality of sampling bottles 40. For each sampling bottle 40, a sample discharge line 42 extends from multi-position valve 36 to the sampling bottle 40. Although fewer or more sampling bottles 40 may be provided, in FIG. 1, eight sampling bottles 40a, 40b, 40c, 40d, 40e, 40f, 40g, and 40h are shown with corresponding sample discharge lines 42a, 42b, 42c, 42d, 42e, 42f, 42g, and 42h, respectively. Multi-position valve 36 and sampling bottles 40 are disposed to so that different samples can be retrieved and maintained in separate bottles 40. For example, sampling bottle 40a may only receive 1 sample each day at one or more select times, while sampling bottle 40b may receive one or more samples at a different time of day. Likewise, a third sampling bottle 40c may receive samples only after a particular operation, such as steam injection or wellbore acidizing, occurs. Although not limited to a particular volume, in one embodiment, each sampling bottle 40 is 1 liter providing for at least 700 samples (at a 70% fill rate for a sampler 32 obtaining 1 cubic centimeter samples). The multiple sampling bottles 40 permit various samples to be taken under different conditions at the remote location without intermingling the samples, thereby permitting a more accurate representation of the production environment for a particular wellbore. Likewise, samples collected can be easily and efficiently diverted to different sampling bottles 40 based on the test duration or volume for the desired number of tests.

To facilitate operation of multi-position valve 36, as well as other components of wellbore fluid sampling system 10, wellbore fluid sampling system 10 includes a controller/flow computer 44 which may be powered by a local power source 46, such as the illustrated solar panels 46a and/or battery 46b. In one or more preferred embodiments, local power source 46 is carried on platform 12 so that wellbore fluid sampling system 10 is fully self-contained. In this regard, solar panels 46a may be utilized to charge and recharge battery 46b. In other embodiments, local power source 46 may be a power grid. Controller/flow computer 44 may be utilized to adjust multi-position valve 36 in order to direct a sample or samples into a desired sampling bottle 40. In one or more embodiments, controller 44 is an electronic, digital controller and permits automatic operation of wellbore fluid sampling system 10.

In one or more embodiments, in addition to, or alternatively to local power source 46, or process pressure via valve 52d, a local gas source 48 may be provided to operate various components of wellbore fluid sampling system 10, such as sampler 32 and multi-position valve 36, as well as other valves and the like. In one or more embodiments, local gas source 48 may be one or more cylinders of compressed gas, such as air or nitrogen. Without limiting the foregoing, gas source 48 may be one or more nitrogen cylinders since nitrogen gas is understood to be high in compressibility, with inert properties, and is miscible with water, making it suitable for a wide range of industrial applications. This is particularly desirable in the remote locations and harsh weather environments where wellbore fluid sampling system 10 will be deployed.

In one or more embodiments, wellbore fluid sampling system 10 may include one or more flow meters 50. In one embodiment, a liquid flow meter 50a may be positioned upstream or downstream of static mixer 26 to measure the flow and/or density of liquid flowing to sampler 32. In this regard, sampler 32 and flow meter 50a are may be synchronized or otherwise electrically coupled or controlled by controller 44 so that the flow rate measured by liquid flow meter 50a determines the number of samples collected by sampler 32. Thus, as flow rate increases, frequency of samples collected by sampler 32 increases, and as the flow rate decreases, the sample rate likewise decreases. In other words, the liquid flow meter 50a and the sampler 32 together can be utilized as a proportional or dynamic sampling system where the sample rate is based on the measured flow rate.

Further, a vapor flow meter 50b may be positioned downstream of a vapor outlet 20 of separator unit 14 to measure the flow and/or density of gas separated by separator unit 14. In some embodiments, flow meter 50a is a Coriolis flow meter or a positive displacement meter and may include sensors powered by local power source 46. In some embodiments, flow meter 50b is a Coriolis flow meter or a vortex meter and may include sensors powered by local power source 46 (46a and 46b). In the illustrated embodiment of FIGS. 3A-3D, a flow meter 50a, 50b is positioned downstream of each of the liquid outlet 22 and vapor outlet 20, respectively, of vessel 16 in order to measure the respective liquid and vapor flow from separator 14, with the flow meters electrically coupled to controller/computer 44 in order to calculate gross fluid flow of each of the liquid and vapor components from separator unit 14.

Various other valves 52 may also be provided in wellbore fluid sampling system 10 to manage fluid flow throughout wellbore fluid sampling system 10.

FIGS. 3A-3D and 4 illustrate process flow of the above-described wellbore fluid sampling system 10. Fluid from a wellbore 54 (see FIG. 4) is directed to an inlet 18 of separator unit 14. Flow to inlet 18 is controlled by isolation valve 52a which may be used to isolate wellbore fluid sampling system 10 from wellbore 54. Pressure and temperature of incoming wellbore fluid may be measured by sensors 53a, 53b and logged by controller 44. In any event, the incoming wellbore fluid is directed into separator unit 14 that separates the wellbore fluid into a liquid stream (which may contain oil, water and other liquids) and a vapor stream. The liquid stream exits separator unit 14 through liquid outlet 22 and the vapor stream exits separator unit 14 through outlet 20. The liquid stream may then be passed through a flow/density meter 50a, while the vapor stream may be passed through a vapor flow meter 50b. Flow rates of both streams may be logged by controller 44. The liquid stream is then passed to a mixer 26 where stratified liquids are mixed to ensure that samples subsequently collected downstream are representative of the cut of incoming liquids. After passing through mixer 26, the homogenous liquid stream flows along line 28 where a sampler 32 extracts a sample of the liquid stream and directs the collected sample via line 34 to a multi-position valve 36. Multi-position valve 36 is controlled by controller 44 to direct the sample along one of a plurality of sample discharge lines 42 to one of a plurality of sampling bottles 40. Controller 44 can control the frequency and volume of collected samples and allows multiple samples to be collected under various conditions to satisfy different requirements. In any event, local power sources, such as solar panel 46a and batteries 46b may supply power to operate controller 44 and the various sensors 53. Likewise, local gas source 48 may be utilized to actuate multi-position valve 36 and sampler 32 via pneumatic lines 49. In any event, the remaining liquid flow along line 28 is directed to outlet 30a. Isolation valve 52b, like isolation valve 52a, may be utilized to isolate wellbore fluid sampling system 10. In one or more embodiments, pressure takeoff valve 52d may be located upstream of valve 52a in order to permit process pressure to operate wellbore fluid sampling system 10 even when wellbore fluid sampling system 10 is otherwise isolated by valves 52a and 52b from fluid communication with the wellbore.

As discussed above, wellbore fluid sampling system 10 may be deployed in remote locations with limited power access. In the illustrated embodiment, separator unit 14 and mixer 26 are static with no moving parts, thereby minimizing the need to send maintenance crews to remote locations between bottle recovery. Moreover, multi-position valve 36 and sampler 32 are pneumatic, utilizing compressed gas from a local gas source 48 to drive operation. In other embodiments, multi-position valve 36 and sampler 32 may be operated by process pressure, namely the pressure of fluid from the wellbore. One or more devices may be provided with low power position sensors 55 to measure the position of pneumatically actuated equipment such as multi-position valve 36 and sampler 32 and provide feedback to controller 44. It will be appreciated that controller 44 and low power position sensors 55 may be readily operated by local power source 46 (46a and 46b) with little electrical demand, thus permitting wellbore fluid sampling system 10 to be generally self-sustaining.

Although shown as separate liquid outlet 30a and vapor outlet 30b in FIGS. 3A-3D, in some embodiments such as FIG. 1, vapor flowline 29 (and hence vapor outlet 30b) is in fluid communication with liquid outlet 30a so that vapor from separator unit 14 is recombined with liquid from separator unit 14 downstream of multi-position valve 36 prior to directing the combined fluid back into a production line (not shown).

Figure 4:
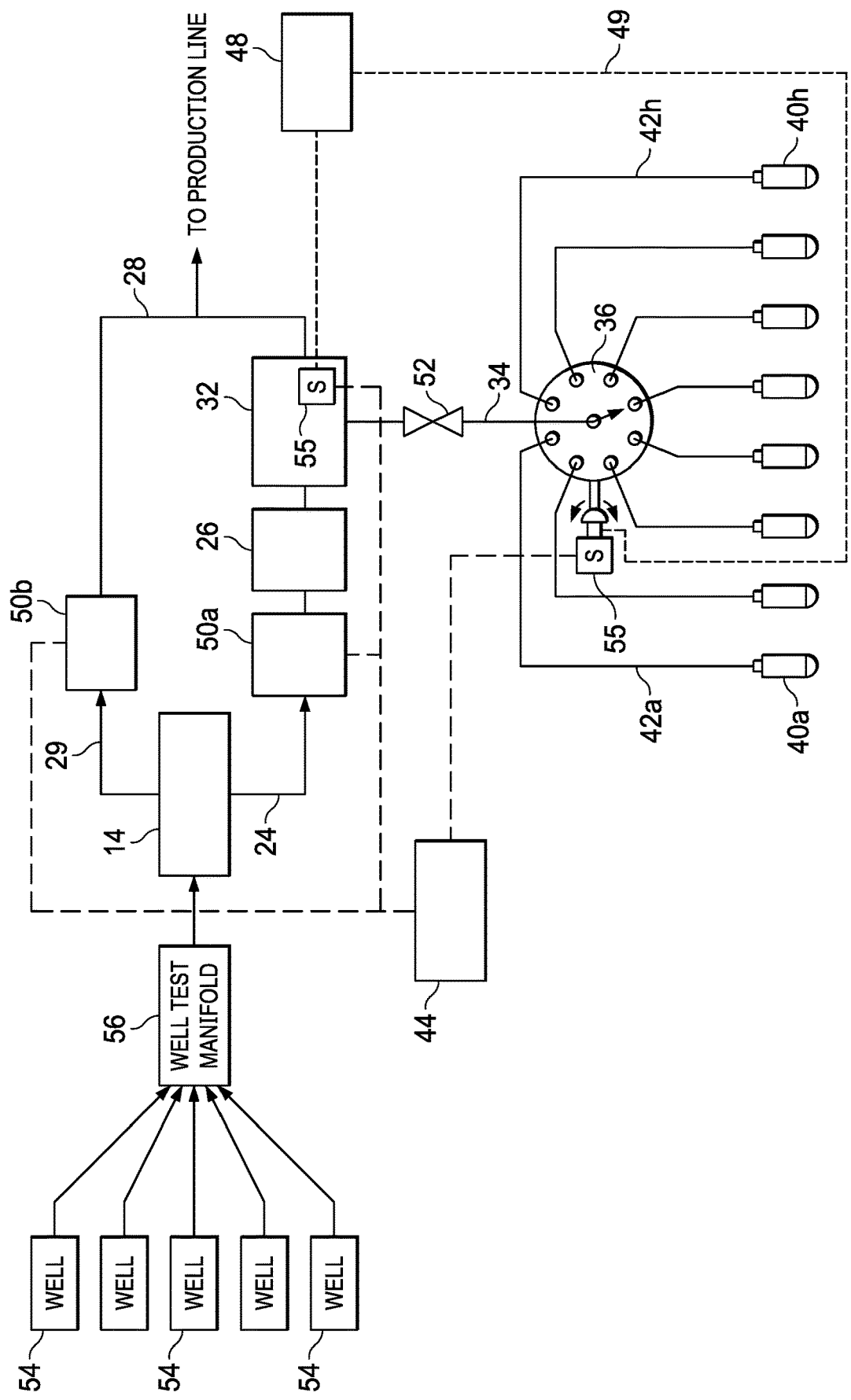
FIG. 4 is a schematic diagram illustrating pneumatic control of the well test system of FIG. 1.

FIG. 4 also illustrates that wellbore fluid sampling system 10 can be utilized to collect samples from a plurality of wellbores 54 by collecting formation fluid from the plurality of wellbores 54 in a well test manifold 56 in fluid communication with separator unit 14. In some embodiments, well test manifold 56 is incorporated as part of wellbore fluid sampling system 10, carried on platform 12 so as to minimize the need for any additional equipment on site in order to conduct sampling. As best seen in FIGS. 3A-3D, wellbore fluid sampling system 10 may include a production fluid inlet valve 52a and a liquid fluid outlet valve 52b, both of which can be actuated to isolate wellbore fluid sampling system 10 from wellbore fluid pressures and temperatures utilizing one or more pressure and temperatures sensors 53a, 53b, respectively, upstream of production fluid inlet valve 52a. It will be appreciated that particularly with respect to wellbores undergoing steam treatment, steam forming part of the wellbore fluid may be under high pressure and high temperature that could be harmful to wellbore fluid sampling system 10. Thus, utilizing pressure sensor 53a and/or a temperature sensor 53b, controller/flow computer 44 can be utilized to monitor the pressure and temperature of incoming formation fluid. Should temperature and/or pressure exceed predetermined threshold values, controller/flow computer 44 may be utilized to actuate isolation valves 52a and 52b to a closed position and actuate by-pass valve 52e to an open position, directing fluid flow along bypass flowline 47 in order to isolate wellbore fluid sampling system 10. Specifically, the bypass flowline 47 intersects each of the inlet flowline 18a and the liquid return flowline 28 with bypass valve 52e positioned along the bypass flowline 47. The actuated valve 52e can automatically bypass the hydrocarbon flow along bypass flowline 47 and away from separator unit 14 in the event that valves 52a and 52b isolate the unit 10. In other embodiments, pressure sensor 53a and/or temperature sensor 53b may be independent of flow computer 44.

In one or more embodiments, separator unit 14 also contains a liquid level mechanism 60, such as a float, linked to level control valve 52c to control the level of liquid within vessel 16. As described above, level control valve 52c may be placed along vapor flowline 29 to control vapor pressure within vessel 16 based on the position of liquid level mechanism 60 within vessel 16. In other embodiments, level control valve 52c may be positioned along liquid flowline 24 to control flow of liquid therethrough based on the position of liquid level mechanism 60. In such case, level control valve 52c is positioned upstream of a bypass valve 52f. Bypass valve 52f is operable in conjunction with valves 52g and 52h to inhibit liquid flow to mixer 26 and sampler 32 as desired.

The gross fluid flow/density from liquid flow meter 50a and gross gas flow from vapor meter 50b along with the fluid pressure from pressure sensor 53c and fluid temperature from temperature sensor 53d are collected by controller/flow computer 44 and correlated to specific homogenous liquid samples collected by sampler 32. In other words, controller/flow computer 44 logs gross flow, process temperature, process pressure, as well as receives inputs from sensors for automatic wellbore fluid sampling system 10 control, including start, ready, stop, etc. In other words, controller 44 may be used to control time periods and synchronize process pressure and temperature to samples within particular sampling bottles 40, particularly where the sampling may occur multiple times over various time periods of hours, days or even weeks before the sampling bottles 40 are collected for analysis. In this regard, each bottle 40 may include a unique identification tag or device, such as a bar code or radio frequency identification or the like, thereby aiding in correlation between samples, sampling data, and sampling conditions at the wellhead, as well as coordination with external activities such as formation and wellbore treatments such as steam injection, acidizing or hydraulic fracturing. After the well test is complete, a basic sediment and water analysis, BS&W, may be performed on the sample to determine water cut and a density meter will be used to measure the oil density. The water cut and oil density may then be combined with logged information from controller 44 to calculate total oil flow, corrected to standard conditions.

Thus, a hydrocarbon well test unit has been described. In one or more embodiments, the hydrocarbon well test unit may include a two-phase separator unit, the separator unit having a hydrocarbon inlet, a vapor outlet and a liquid outlet; a mixer in fluid communication with the liquid outlet; a liquid sampler in fluid communication with the mixer downstream of the mixer; a multi-position valve in fluid communication with the liquid sampler, the multi-position valve having a valve inlet and a plurality of valve outlets; a plurality of sample discharge lines, each of the discharge lines in fluid communication with a different valve outlet; a plurality of sample bottles, each sample bottle in fluid communication with a separate sample discharge line; a controller to actuate the multi-position valve in order to direct a sample into a particular sample bottle; and a platform on which the separator unit, mixer, liquid sampler, multi-position valve, sample bottles and controller are mounted. In other embodiments, the hydrocarbon well test unit may include a two-phase separator unit, the separator unit having a hydrocarbon inlet, a vapor outlet and a liquid outlet; a liquid flow meter in fluid communication with the liquid outlet of the two-phase separator; a static mixer in fluid communication with the liquid flow meter; a pneumatic liquid sampler in fluid communication with the static mixer downstream of the static mixer; a pneumatic, multi-position valve having an inlet in fluid communication with the liquid sampler and at least 4 outlets; at least four sample discharge lines, each of the discharge lines in fluid communication with a different valve outlet; at least four sampling bottles, each sampling bottle in fluid communication with a separate sample discharge line; a controller to actuate the multi-position valve in order to direct a sample into a particular sample bottle; at least one solar panel; at least one battery electrically coupled to the solar panel, the at least one battery providing power to the controller; a compressed gas source in fluid communication with the liquid sampler and multi-position valve; and a platform on which the separator unit, mixer, liquid sampler, multi-position valve, sample bottles, controller, at least one solar panel, and at least one battery are mounted.

Any of the foregoing embodiments of a hydrocarbon well test unit may include one or more of the following elements, alone or in combination with other elements:

The mixer is a static mixer.

A liquid flow meter fluidically coupled between the liquid outlet of the two-phase separator unit and the liquid sampler.

The liquid sampler is pneumatically actuated.

The multi-position valve is pneumatically actuated.

A hydrocarbon inlet line in fluid communication with the hydrocarbon inlet of the two-phase separator; and at least one pressure takeoff valve disposed along the hydrocarbon inlet line, wherein the liquid sampler is pneumatically actuated and fluidically coupled to a pressure takeoff valve; and wherein the multi-position valve is pneumatically actuated and fluidically coupled to a pressure takeoff valve.

A compressed gas source carried by the platform; wherein the liquid sampler is pneumatically actuated and fluidically coupled to the gas source; and wherein the multi-position valve is pneumatically actuated and fluidically coupled to the gas source.

A level control valve fluidically coupled to the vapor outlet of the two-phase separator unit and controlling flow of liquid to the mixer.

A vapor flow meter fluidically coupled to the vapor outlet of the two-phase separator unit.

A fluid inlet flowline in fluid communication with the hydrocarbon inlet of the two-phase separator unit; a liquid return flowline in fluid communication with the mixer and sampler; a bypass flowline intersecting with each of the fluid inlet flowline and the liquid return flowline; a first isolation valve disposed along the fluid inlet flowline between the intersection of the bypass flowline and the hydrocarbon inlet of the two-phase separator; a second isolation valve disposed along the liquid return flowline between the intersection of the bypass flowline and the sampler; and a bypass valve disposed along the bypass flowline and movable between a first closed position and a second open position.

A hydrocarbon inlet line in fluid communication with the hydrocarbon inlet of the two-phase separator; wherein the compressed gas source is and at least one pressure takeoff valve disposed along the hydrocarbon inlet line.

The compressed gas source is carried by the platform.

A liquid flow meter controls the sample rate of the liquid sampler.

Likewise, a method of collecting hydrocarbon samples from a well has been described. In one or more embodiments, the method may include directing a fluid flow from a well into a two-phase separator; separating the fluid flow into a liquid stream and a vapor stream; measuring the flow rate of the liquid stream; agitating the liquid stream to mix the oil and water forming the liquid stream; and based on the measured flowrate, extracting a first sample of the agitated liquid stream and directing the first sample to a first sample collection bottle.

Any of the foregoing embodiments of a method of collecting hydrocarbon samples from a well may include one or more of the following, alone or in combination with one another:

Extracting a second sample of the agitated liquid stream and directing the second sample to a second sample collection bottle.

Repeating the step of extracting and directing for each of a third, fourth, fifth, sixth and seventh sample and corresponding third, fourth, fifth, sixth and seventh collection bottles.

Actuating a multi-position valve based on the measured flowrate to direct the extracted samples to their corresponding collection bottles.

Actuating a sampler based on the measured flowrate to extract a sample from the agitated liquid stream.

Actuating a sampler based on the measured flowrate to extract a sample from the agitated liquid stream; and actuating a multi-position valve based on the measured flowrate to direct the extracted samples to their corresponding collection bottles.

Utilizing compressed gas to actuate the sampler and multi-position valve.

Utilizing the fluid flow from the well to actuate the sampler and multi-position valve.

Utilizing a static mixer to agitate the liquid stream.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A hydrocarbon well test unit comprising:
a two-phase separator unit, the separator unit having a hydrocarbon inlet, a vapor outlet and a liquid outlet;
a mixer in fluid communication with the liquid outlet;
a liquid sampler in fluid communication with the mixer downstream of the mixer;
a multi-position valve in fluid communication with the liquid sampler, the multi-position valve having a valve inlet and a plurality of valve outlets;
a plurality of sample discharge lines, each of the discharge lines in fluid communication with a different valve outlet;
a plurality of sample bottles, each sample bottle in fluid communication with a separate sample discharge line;
a controller to actuate the multi-position valve in order to direct a sample into a particular sample bottle; and
a platform on which the separator unit, mixer, liquid sampler, multi-position valve, sample bottles and controller are mounted.

2. The hydrocarbon well test unit of claim 1, wherein the mixer is a static mixer.

3. The hydrocarbon well test unit of claim 1, wherein the liquid sampler is pneumatically actuated.

4. The hydrocarbon well test unit of claim 1, wherein the multi-position valve is pneumatically actuated.

5. The hydrocarbon well test unit of claim 1, further comprising a hydrocarbon inlet line in fluid communication with the hydrocarbon inlet of the two-phase separator; and at least one pressure takeoff valve disposed along the hydrocarbon inlet line, wherein the liquid sampler is pneumatically actuated and fluidically coupled to a pressure takeoff valve; and wherein the multi-position valve is pneumatically actuated and fluidically coupled to a pressure takeoff valve.

6. The hydrocarbon well test unit of claim 1, further comprising a compressed gas source carried by the platform;

wherein the liquid sampler is pneumatically actuated and fluidically coupled to the gas source; and wherein the multi-position valve is pneumatically actuated and fluidically coupled to the gas source.

7. The hydrocarbon well test unit of claim 1, further comprising a level control valve fluidically coupled to the vapor outlet of the two-phase separator unit and controlling flow of liquid to the mixer.

8. The hydrocarbon well test unit of claim 1, further comprising a fluid inlet flowline in fluid communication with the hydrocarbon inlet of the two-phase separator unit; a liquid return flowline in fluid communication with the mixer and sampler; a bypass flowline intersecting with each of the fluid inlet flowline and the liquid return flowline; a first isolation valve disposed along the fluid inlet flowline between the intersection of the bypass flowline and the hydrocarbon inlet of the two-phase separator; a second isolation valve disposed along the liquid return flowline between the intersection of the bypass flowline and the sampler; and a bypass valve disposed along the bypass flowline and movable between a first closed position and a second open position.

9. The hydrocarbon well test unit of claim 1, further comprising a liquid flow meter fluidically coupled between the liquid outlet of the two-phase separator unit and the liquid sampler.

10. The hydrocarbon well test unit of claim 9, further comprising a vapor flow meter fluidically coupled to the vapor outlet of the two-phase separator unit.

11. A hydrocarbon well test unit comprising:
a two-phase separator unit, the separator unit having a hydrocarbon inlet, a vapor outlet and a liquid outlet;
a liquid flow meter in fluid communication with the liquid outlet of the two-phase separator;
a static mixer in fluid communication with the liquid flow meter;
a pneumatic liquid sampler in fluid communication with the static mixer downstream of the static mixer;
a pneumatic, multi-position valve having an inlet in fluid communication with the liquid sampler and at least 4 outlets;
at least four sample discharge lines, each of the discharge lines in fluid communication with a different valve outlet;
at least four sampling bottles, each sampling bottle in fluid communication with a separate sample discharge line;
a controller to actuate the multi-position valve in order to direct a sample into a particular sample bottle;
at least one solar panel;
at least one battery electrically coupled to the solar panel, the at least one battery providing power to the controller;
a compressed gas source in fluid communication with the liquid sampler and multi-position valve; and
a platform on which the separator unit, mixer, liquid sampler, multi-position valve, sample bottles, controller, at least one solar panel, and at least one battery are mounted.

12. The hydrocarbon well test unit of claim 11, further comprising a hydrocarbon inlet line in fluid communication with the hydrocarbon inlet of the two-phase separator; wherein the compressed gas source is and at least one pressure takeoff valve disposed along the hydrocarbon inlet line.

13. The hydrocarbon well test unit of claim 11, wherein the compressed gas source is carried by the platform.

14. The hydrocarbon well test unit of claim 11, wherein liquid flow meter controls a sample rate of the liquid sampler.

* * * * *